United States Patent
Brownjohn et al.

(10) Patent No.: US 9,503,192 B2
(45) Date of Patent: Nov. 22, 2016

(54) DATA NETWORK, AIRCRAFT OR SPACECRAFT, AND METHOD

(71) Applicants: Airbus Operations GmbH, Hamburg (DE); Airbus Operations (S.A.S), Toulouse (FR)

(72) Inventors: Nicholas Brownjohn, Buxtehude (DE); Stefan Osternack, Hamburg (DE); Stéphane Poulain, Steinkirchen (DE); Xavier Valancogne, Toulouse (FR); Nils Fischer, Hamburg (DE)

(73) Assignees: Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/535,833

(22) Filed: Nov. 7, 2014

(65) Prior Publication Data
US 2015/0132010 A1 May 14, 2015

(30) Foreign Application Priority Data
Nov. 11, 2013 (EP) .................................. 13 192 348

(51) Int. Cl.
*H04B 10/12* (2006.01)
*H04B 10/27* (2013.01)
*H04L 12/40* (2006.01)
(Continued)

(52) U.S. Cl.
CPC ......... *H04B 10/27* (2013.01); *H04L 12/40176* (2013.01); *H04L 67/12* (2013.01); *H04L 45/28* (2013.01); *H04L 2012/4028* (2013.01)

(58) Field of Classification Search
CPC . H04B 10/27; H04L 12/40176; H04L 67/12; H04L 45/28; H04L 2012/4028
USPC ................... 398/115, 116, 141, 60, 164
See application file for complete search history.

(56) References Cited

U.S. PATENT DOCUMENTS

| 4,422,180 A | * | 12/1983 | Wendt | ................. B64C 13/503 244/194 |
| 2009/0202241 A1 | * | 8/2009 | Yu | .................... H04B 10/27 398/58 |

(Continued)

OTHER PUBLICATIONS

Holger Heine et al. ("The High-Availability Seamless redundancy protocol (HSR): Robust fault-tolerant networking and loop prevention through duplicate discard", Factory Communication Systems (WFCS), May 21, 2012, pp. 213-222, 9th IEEE International Workshop On, IEEE).*

(Continued)

*Primary Examiner* — M. R. Sedighian
(74) *Attorney, Agent, or Firm* — Jenkins, Wilson, Taylor & Hunt, P.A.

(57) ABSTRACT

A data network, especially a data network for an aircraft or spacecraft, includes a primary data grid, and at least one secondary data grid, the primary data grid including primary data nodes, wherein the primary data nodes are directly or indirectly coupled in data communication with each other, and the at least one secondary data grid comprising secondary data nodes, wherein the at least one secondary data grid is configured to connect the secondary data nodes in a data communication chain and to connect the first secondary data node of the data communication chain to a first respective primary data node and/or the last secondary data node of the data communication chain to a second respective primary data node.

14 Claims, 8 Drawing Sheets

(51) Int. Cl.
*H04L 29/08* (2006.01)
*H04L 12/703* (2013.01)

(56) References Cited

U.S. PATENT DOCUMENTS

2010/0180299 A1\* 7/2010 Girard .................... H01Q 1/28
 725/39
2011/0107377 A1\* 5/2011 Petrisor ............. H04L 12/40182
 725/76
2012/0290692 A1 11/2012 Reich et al.

OTHER PUBLICATIONS

European Search Report for Application No. 13 19 2348 dated Mar. 27, 2014.
Holger Heine et al: "The High-Availability Seamless redundancy protocol (HSR): Robust fault-tolerant networking and loop prevention through duplicate discard", Factory Communication Systems (WFCS), May 21, 2012, pp. 213-222, 9th IEEE International Workshop On, IEEE.

\* cited by examiner

DATA NETWORK, AIRCRAFT OR SPACECRAFT, AND METHOD

CROSS-REFERENCE TO RELATED APPLICATION

This application claims the benefit of and priority to European Patent Application No. 13 192 348.4, filed Nov. 11, 2013, the entire disclosure of which is incorporated by reference herein.

TECHNICAL FIELD

The disclosure relates to a data network, especially a data network for an aircraft or spacecraft, an aircraft or spacecraft, and a method for transmitting data in an aircraft or spacecraft.

BACKGROUND

Although applicable to any system that comprises data transmission, the present disclosure will be described in combination with data transmission in an aircraft or spacecraft. The disclosure can e.g. be applied to ships and other platforms (even buildings) where standardized wiring reconfiguration could be advantageous.

In modern aircraft a plurality of electronic devices are used for a plurality of different tasks ranging from aircraft control to passenger entertainment.

For example electronic devices can be used for control of rudders, flaps and the like. Furthermore, electronic devices can be used for cabin lighting, passenger information and the like. Further applications of electronic devices in an aircraft include infotainment systems and other passenger services like on board internet access.

In today's aircraft most electronic systems each comprise their own data transmission means based on separate copper wire based data networks. Such system architecture leads to a complex aircraft network with a high total weight. Furthermore such system architectures lack modularity and flexibility in terms of upgrading, updating or reconfiguring the system. In order to install such a system architecture in an aircraft a long, complex and highly iterative installation process is necessary.

Accordingly, there is a need for providing more flexible system architectures for an aircraft or spacecraft.

SUMMARY

The present disclosure solves this problem with a data network, an aircraft or spacecraft and a method for transmitting data in an aircraft or spacecraft.

Accordingly, the present disclosure provides:

A data network, especially a data network for an aircraft or spacecraft, comprising: a primary data grid comprising primary data nodes, wherein the primary data nodes are (directly or indirectly) coupled in data communication with each other; and at least one secondary data grid each comprising secondary data nodes and connecting the secondary data nodes in a data communication chain and connecting the first secondary data node of the data communication chain to a first respective primary data node and/or the last secondary data node of the data communication chain to a second respective primary data node.

An aircraft or spacecraft, comprising a data network according to the present disclosure, and at least one data end consumer coupled to the secondary data grid of the data network.

A method for transmitting data in an aircraft or spacecraft, comprising the steps providing a primary data grid comprising primary data nodes, providing at least one secondary data grid comprising secondary data nodes, the secondary data nodes being connected in a data communication chain, connecting the first secondary data node of the data communication chain to a first respective primary data node and/or the last secondary data node of the data communication chain to a second respective primary data node, connecting at least two data end consumers to the secondary data nodes, and transmitting data between the at least two data end consumers via the primary data grid and/or the secondary data grid.

The present disclosure is based on the conclusion that the present system architectures used in aircraft and spacecraft which comprise their separate wiring and data transmission means lead to more and more complex electronic aircraft architectures.

Therefore, the present disclosure proposes a multi layered network architecture for data transmission in an aircraft or spacecraft where a plurality of aircraft systems share a common network architecture.

The present disclosure provides a first data grid, which serves as an aircraft backbone network with a plurality of primary data nodes. The primary data nodes are coupled in data communication such that every primary data node is coupled to the other primary data nodes directly or indirectly via other primary data nodes.

The present disclosure also provides at least one secondary data grid, which comprises secondary data nodes. In contrast to the primary data grid the secondary data nodes of the secondary data grid are connected in a data communication chain, also called daisy chain. To connect the data communication chain to the primary data network either the first secondary data node in a data communication chain or the last secondary data node in a data communication chain or both the first and the last secondary data node in a data communication chain can be connected to a primary data node. The first and the last secondary data nodes can be connected to the same or different primary data nodes, depending on the specific application.

The data network according to the present disclosure can comprise a plurality of secondary data grids. For example the secondary data grids can be locally installed at spots or regions of an aircraft or spacecraft where data access is necessary in the aircraft or spacecraft.

A secondary data grid can comprise as many secondary data nodes as necessary in a specific location or region of an aircraft.

The present disclosure allows to connect electrical systems to a data network in an aircraft and to provide access points for such electrical systems at every secondary data node.

The present disclosure, therefore, provides a flexible architecture for networking in an aircraft that is easily extendible and adaptable to new applications without the need to modify the backbone data network.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

Figure 1:
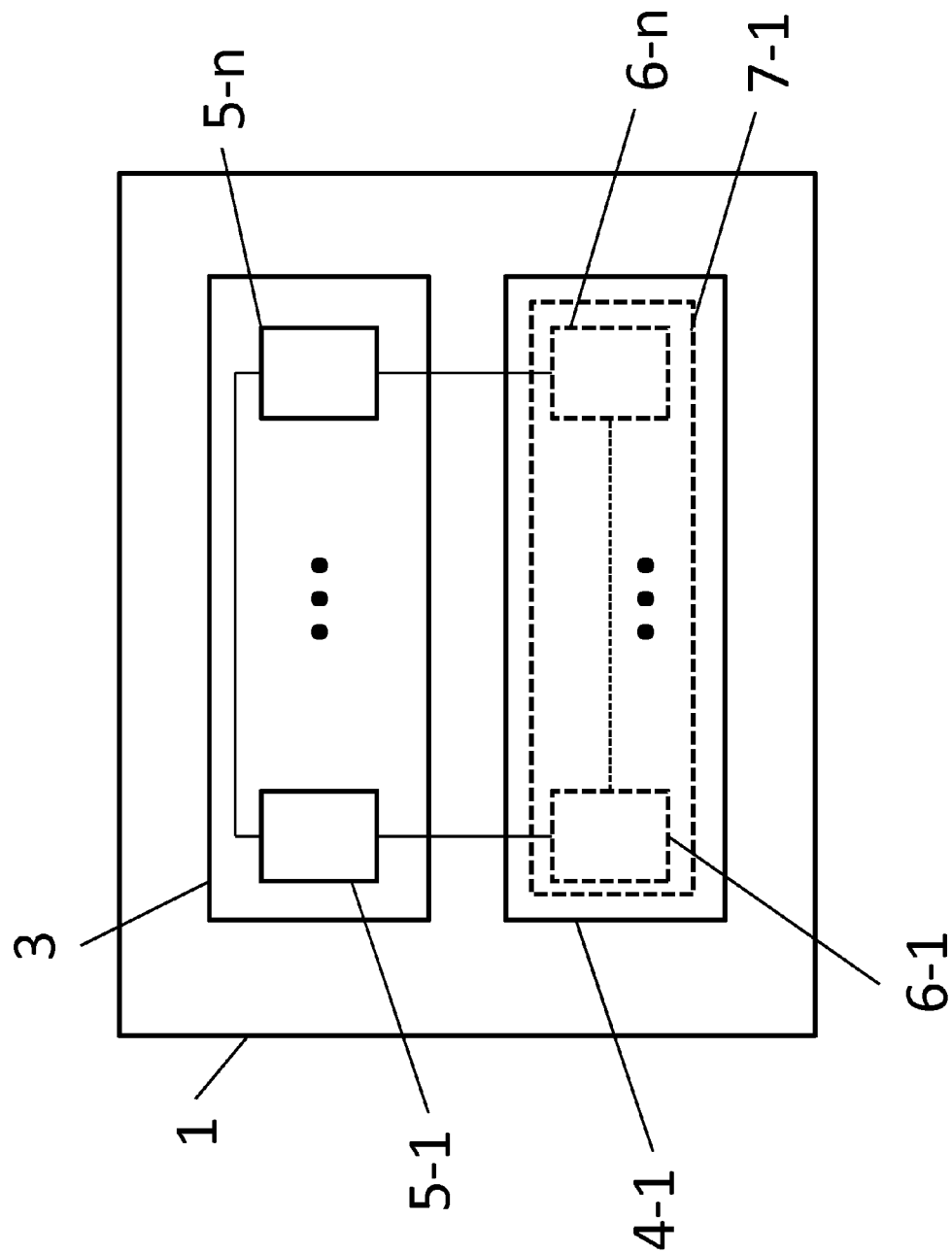
FIG. 1 shows a block diagram of an embodiment of a data network according to the present disclosure.

In the drawings, like, functionally equivalent and identically operating elements, features and components are provided with like reference signs in each case, unless stated otherwise.

DETAILED DESCRIPTION

FIG. 1 shows a block diagram of an embodiment of a data network 1 according to the present disclosure.

The data network 1 comprises a primary data grid 3 and a secondary data grid 4-1.

In the primary data grid 3 there are located two primary data nodes 5-1 and 5-n. An arbitrary number of additional primary data nodes is hinted at by three dots between the two primary data nodes 5-1 and 5-n. Only two primary data nodes 5-1 and 5-n are shown in FIG. 1 and are connected by a single data line. If more primary data nodes where shown in FIG. 1 the additional primary data nodes would be interconnected by a plurality of data lines, wherein multiple routes would be possible between any two primary data nodes 5-1-5-n.

In the secondary data grid 4-1 there are located two secondary data nodes 6-1 and 6-n. Again, an arbitrary number of additional secondary data nodes is hinted at by three dots between the two secondary data nodes 6-1 and 6-n. In the secondary data grid 4-1 the two secondary data nodes 6-1 and 6-n form a data communication chain 7-1. The secondary data nodes 6-1-6-n are depicted by doted outlines. This will be the same throughout the other figures.

The data communication chain 7-1 is configured in a so called daisy chain fashion. That means that a direct data line is provided only between adjacent secondary data nodes 6-1-6-n and that data is routed through the respective secondary data nodes 6-1-6-n when data is to be passed to secondary data nodes 6-1-6-n which are not directly addressable or accessible by the sender.

In an embodiment the primary data grid 3 comprises optical data lines 10-1-10-n to interconnect the primary data nodes 5-1-5-n by a fast and reliably data transmission technology. The optical data connections can especially comprise a data rate of more than 10 gigabits per second.

In a further embodiment the primary data grid 3 is configured to connect any two primary data nodes 5-1-5-n by a maximum of two other primary data nodes 5-1-5-n. In other words, the data route between any two primary data nodes 5-1-5-n comprises a maximum of three hops.

In the embodiment shown in FIG. 1 the primary data nodes 5-1-5-n and the secondary data nodes 6-1-6-n comprise Ethernet switches. In another embodiment the primary data nodes 5-1-5-n and the secondary data nodes 6-1-6-n can comprise any other switching technology which is capable of forwarding data packets in the direction of a receiving unit.

In the data grid 3 of FIG. 1 every primary data node 5-1-5-n routes incoming data packets to every primary data node 5-1-5-n which is directly connected to the sending primary data node 5-1-5-n but the primary data nodes 5-1-5-n which already received the data packets to ensure that data packets are transmitted on different, redundant data routs to a receiving unit. In another embodiment primary data nodes 5-1-5-n comprise a routing table and route incoming data packets only to the preferred next primary data nodes 5-1-5-n for a specific receiving unit according to the routing table. It is also possible for primary data nodes 5-1-5-n to route incoming data packets to two preferred next primary data nodes 5-1-5-n for a specific receiving unit according to the routing table. Other routing algorithms, for example routing algorithms based on a predetermined routing scheme can also be used.

Figure 2:
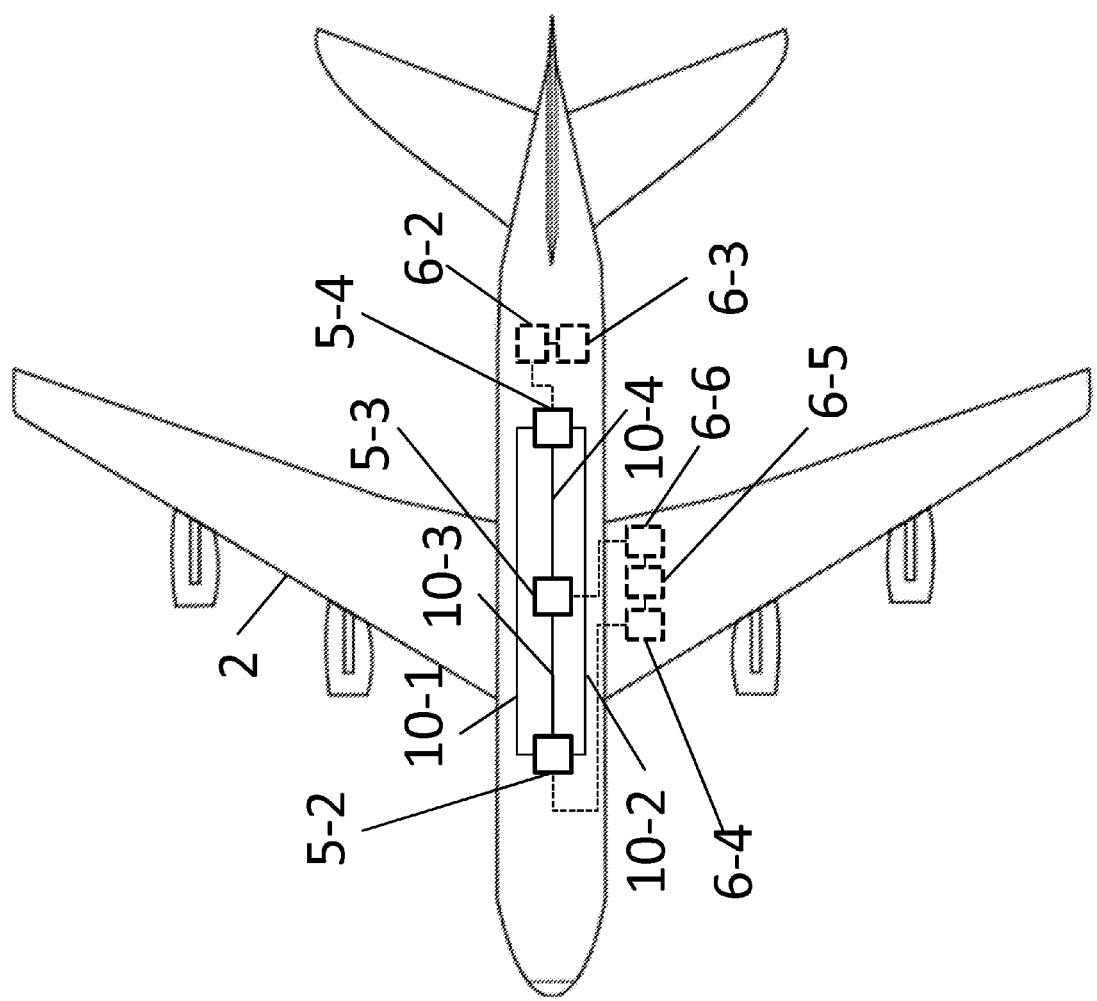
FIG. 2 shows a block diagram of an embodiment of an aircraft according to the present disclosure.

FIG. 2 shows a block diagram of an embodiment of an aircraft 2 according to the present disclosure.

The aircraft 2 comprises one primary data grid, which is not specifically depicted by its outlines but by three primary data nodes 5-2, 5-3 and 5-4, which are interconnected by optical data lines 10-1-10-4. A first optical data line 10-1 connects the first primary data node 5-2 to the third primary data node 5-4. A second optical data line 10-2 also connects the first primary data node 5-2 to the third primary data node 5-4. Furthermore, a third optical data line 10-3 connects the first primary data node 5-2 to the second primary data node 5-3. Finally a fourth optical data line 10-4 connects the second primary data node 5-3 to the third primary data node 5-4.

The aircraft 2 furthermore comprises two secondary data grids which are not shown by their outlines, either. As well as the primary data grid the secondary data grids are shown by their respective secondary data nodes 6-2-6-6.

The first secondary data grid comprises the first secondary data node 6-2 and the second secondary data node 6-3 which is connected to the first secondary data node 6-2. The first secondary data node 6-2 of the first secondary data grid is connected to the third primary data node 5-4 of the primary data grid.

The second secondary data grid comprises three secondary data nodes 6-4-6-6 which are connected in a data communication chain or daisy chain. The first secondary data node 6-4 of the second secondary data grid is connected to the first primary data node 5-2 and the third primary data node 6-6 of the second secondary data grid is connected to the second primary data node 5-3.

In the aircraft 2 the locations of the primary data nodes 5-2-5-4 are selected such that the optical data lines 10-1-10-4 run through the airframe of the aircraft 2 in different locations. This prevents more than one optical data line from being cut if a local damage is inflicted to the airframe of the aircraft e.g. through a fan burst incident.

In FIG. 2 data grid 1 of the present disclosure is shown in combination with a jet engine aircraft 2. In other embodiments the present disclosure can be used with any aircraft 2 or spacecraft. Furthermore, the present disclosure can be used with trucks, cars, trains, container vessels, ships or the like.

Figure 3:
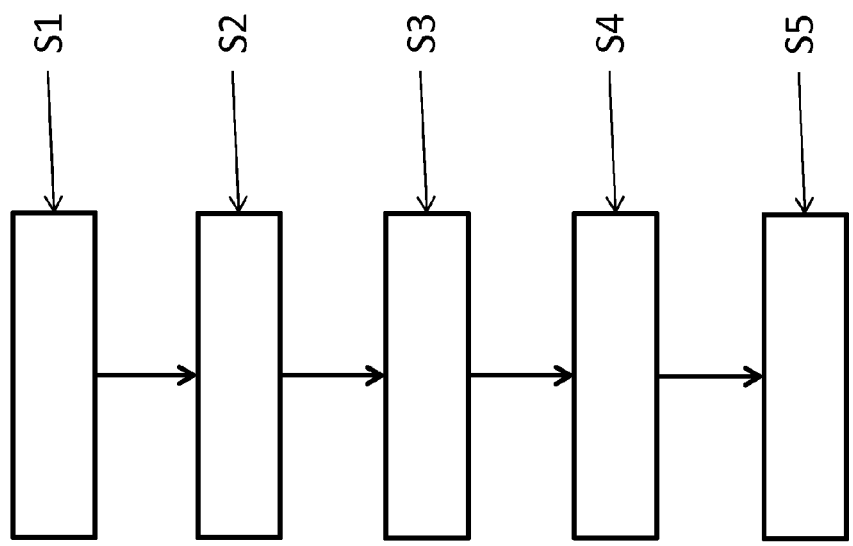
FIG. 3 shows a diagram of an embodiment of a method according to the present disclosure.

FIG. 3 shows a diagram of an embodiment of a method according to the present disclosure.

In a first step S1 a primary data grid 3 comprising primary data nodes 5-1-5-n is provided. In this embodiment the primary data grid 3 is provided in an aircraft. As already explained above the present disclosure can also be used with trucks, cars, trains, container vessels, ships or the like.

In a second step S2 at least one secondary data grid 4-1-4-$n$ comprising secondary data nodes 6-1-6-$n$ is provided, the secondary data nodes 6-1-6-$n$ being connected in a data communication chain 7-1-7-$n$.

A third step S3 comprises connecting the first secondary data node 6-1-6-$n$ of the data communication chain 7-1-7-$n$ to a first respective primary data node 5-1-5-$n$ and/or the last secondary data node 6-1-6-$n$ of the data communication chain 7-1-7-$n$ to a second respective primary data node 5-1-5-$n$.

In a fourth step S4 at least two data end consumers 12-1-12-$n$ are connected to the secondary data nodes 6-1-6-$n$.

Finally, in a fifth step S5 data is transmitted between the at least two data end consumers 12-1-12-$n$ via the primary data grid 3 and/or the secondary data grid 4-1-4-$n$.

In one embodiment data is routed in the fifth step by transmitting at any primary data node 5-1-5-$n$ any incoming data packet to all other primary data nodes 5-1-5-$n$ which are connected to the receiving primary data node 5-1-5-$n$, but the primary data node 5-1-5-$n$ which sent the data packet and/or any other primary data node 5-1-5-$n$ which already received the respective data packet.

In another embodiment the fifth step S5 comprises building a routing table in the primary data nodes 5-1-5-$n$ and/or the secondary data nodes 6-1-6-$n$, and routing incoming data packets based on the receiver of the data packets and the routing table. Redundant routing can be implemented. Furthermore, error correction mechanisms can be implemented in the data transmission.

Figure 4:
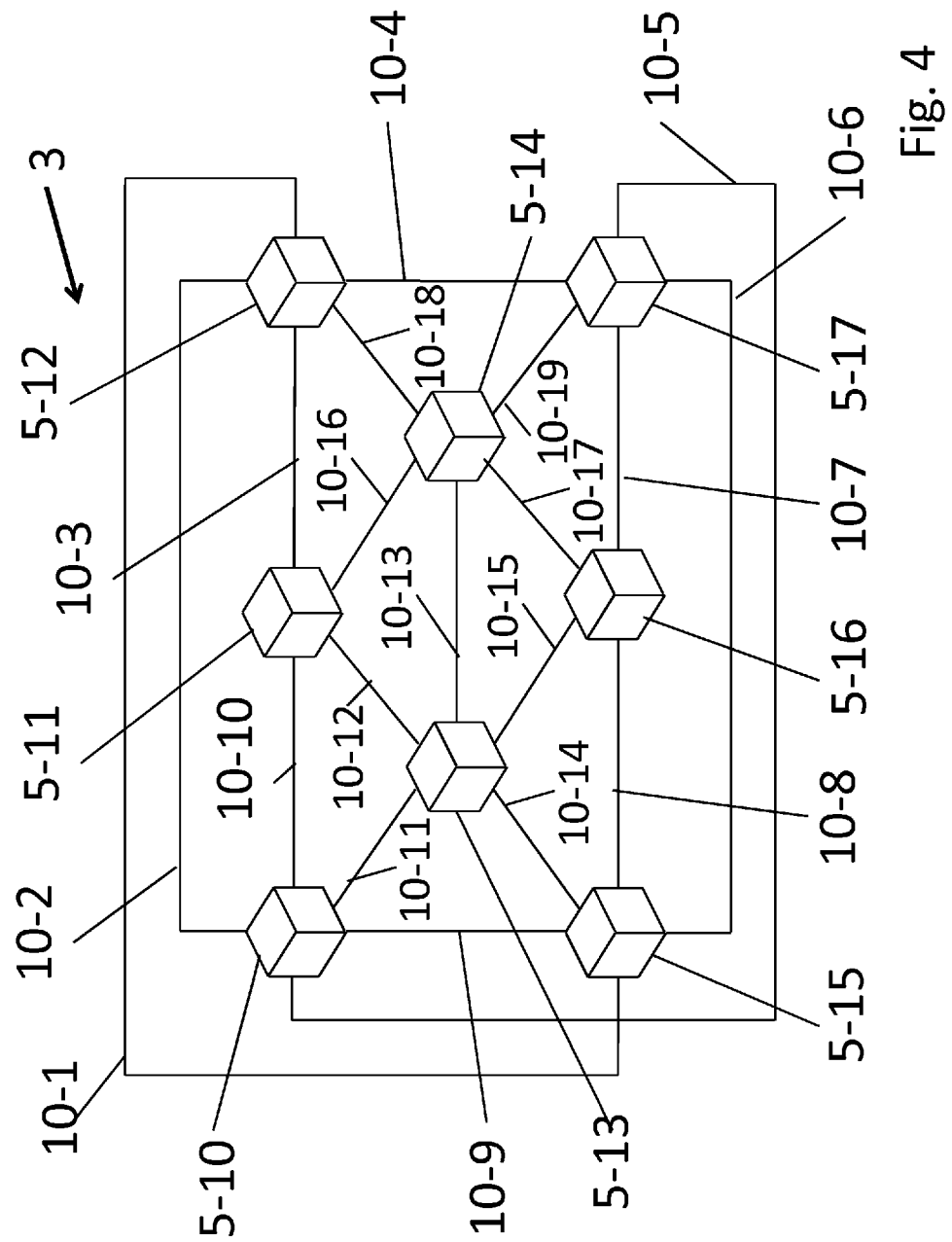
FIG. 4 shows a block diagram of an embodiment of a primary data grid according to the present disclosure.

FIG. 4 shows a block diagram of an embodiment of a primary data grid 3 according to the present disclosure.

The primary data grid 3 comprises eight primary data nodes 5-10-5-17. The first three primary data nodes 5-10-5-12 are positioned in a first row. The fourth and fifth data nodes 5-13 and 5-14 are positioned centrically under the first three primary data nodes 5-10-5-12 in a second row. Finally in a third row the sixth, seventh and eighth primary data nodes 5-15-5-17 are also positioned centrically under the first row.

In FIG. 4 the primary data nodes 5-10-5-17 are connected by a plurality of optical data lines 10-1-10-19. The first optical data line 10-1 connects the sixth primary data node 5-15 to the third primary data node 5-12. The second optical data line 10-2 connects the first primary data node 5-10 to the third primary data node 5-12. The third optical data line 10-3 connects the second primary data node 5-11 to the third primary data node 5-12. The fourth optical data line 10-4 connects the third primary data node 5-12 to the eighth primary data node 5-17. The fifth optical data line 10-5 connects the eighth primary data node 5-17 to the first primary data node 5-10. The sixth optical data line 10-6 connects the eighth primary data node 5-17 to the sixth primary data node 5-15. The seventh optical data line 10-7 connects the eighth primary data node 5-17 to the seventh primary data node 5-16. The eighth optical data line 10-8 connects the sixth primary data node 5-15 to the seventh primary data node 5-16. The ninth optical data line 10-9 connects the first primary data node 5-10 to the sixth primary data node 5-15. The tenth optical data line 10-10 connects the first primary data node 5-10 to the second primary data node 5-11. The eleventh optical data line 10-11 connects the first primary data node 5-10 to the fourth primary data node 5-13. The twelfth optical data line 10-12 connects the second primary data node 5-11 to the fourth primary data node 5-13.

The thirteenth optical data line 10-13 connects the fourth primary data node 5-13 to the fifth primary data node 5-14. The fourteenth optical data line 10-14 connects the sixth primary data node 5-15 to the fourth primary data node 5-13. The fifteenth optical data line 10-15 connects the fourth primary data node 5-13 to the seventh primary data node 5-16. The sixteenth optical data line 10-16 connects the second primary data node 5-11 to the fifth primary data node 5-14. The seventeenth optical data line 10-17 connects the fifth primary data node 5-14 to the seventh primary data node 5-16. The eighteenth optical data line 10-18 connects the third primary data node 5-12 to the fifth primary data node 5-14. Finally, the nineteenth optical data line 10-19 connects the fifth primary data node 5-14 to the eighth primary data node 5-17.

In FIG. 4 it becomes clear how the primary data grid 3 can be organized to provide multiple data routes to the single primary data nodes 5-10-5-17.

If any one of the optical data lines 10-1-10-19 is interrupted data can still be transmitted to any primary data node 5-10-5-17.

Furthermore, in the data grid 3 of FIG. 4 a plurality of optical data lines 10-1-10-19 could be interrupted and data could still be transmitted to any one of the primary data nodes 5-10-5-17.

In another embodiment the number of optical data lines 10-1-10-19 can be higher or lower depending on the quality of the redundancy that is needed by a specific application.

In FIG. 4 not every primary data node 5-10-5-17 comprises a direct data connection to every other primary data node 5-10-5-17. In another embodiment the missing data connections can be implemented such that every primary data node 5-10-5-17 comprises a direct data connection to every other primary data node 5-10-5-17.

In FIG. 4 the data connections are established by optical data lines 10-1-10-19. In another embodiment other data transmission media like cables, e.g. copper cables, air or the like can be used to transmit data between the primary data nodes 5-10-5-17.

Figure 5:
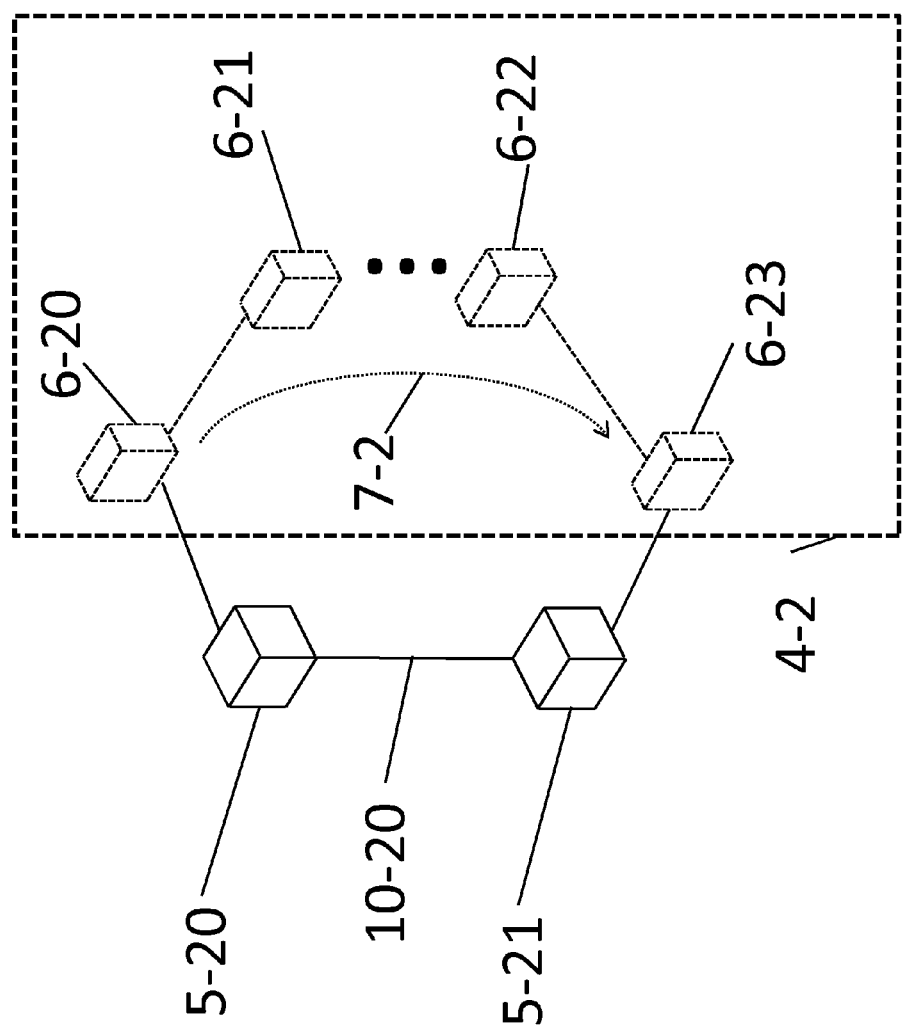
FIG. 5 shows a block diagram of an embodiment of a secondary data grid according to the present disclosure.

FIG. 5 shows a block diagram of an embodiment of a secondary data grid 4-2 according to the present disclosure.

In the secondary data grid 4-2 four secondary data nodes 6-20-6-23 are shown. Further secondary data nodes are hinted at by three dots between the second secondary data node 6-21 and the third secondary data node 6-22. The secondary data nodes 6-20-60-23 are connected in a data communication chain 7-2.

The first secondary data node 6-20 is connected to a first primary data node 5-20 and the fourth secondary data node 6-23 is connected to a second primary data node 5-21. The primary data nodes 5-20 and 5-21 are connected to each other by an optical data line 10-20.

Figure 6:
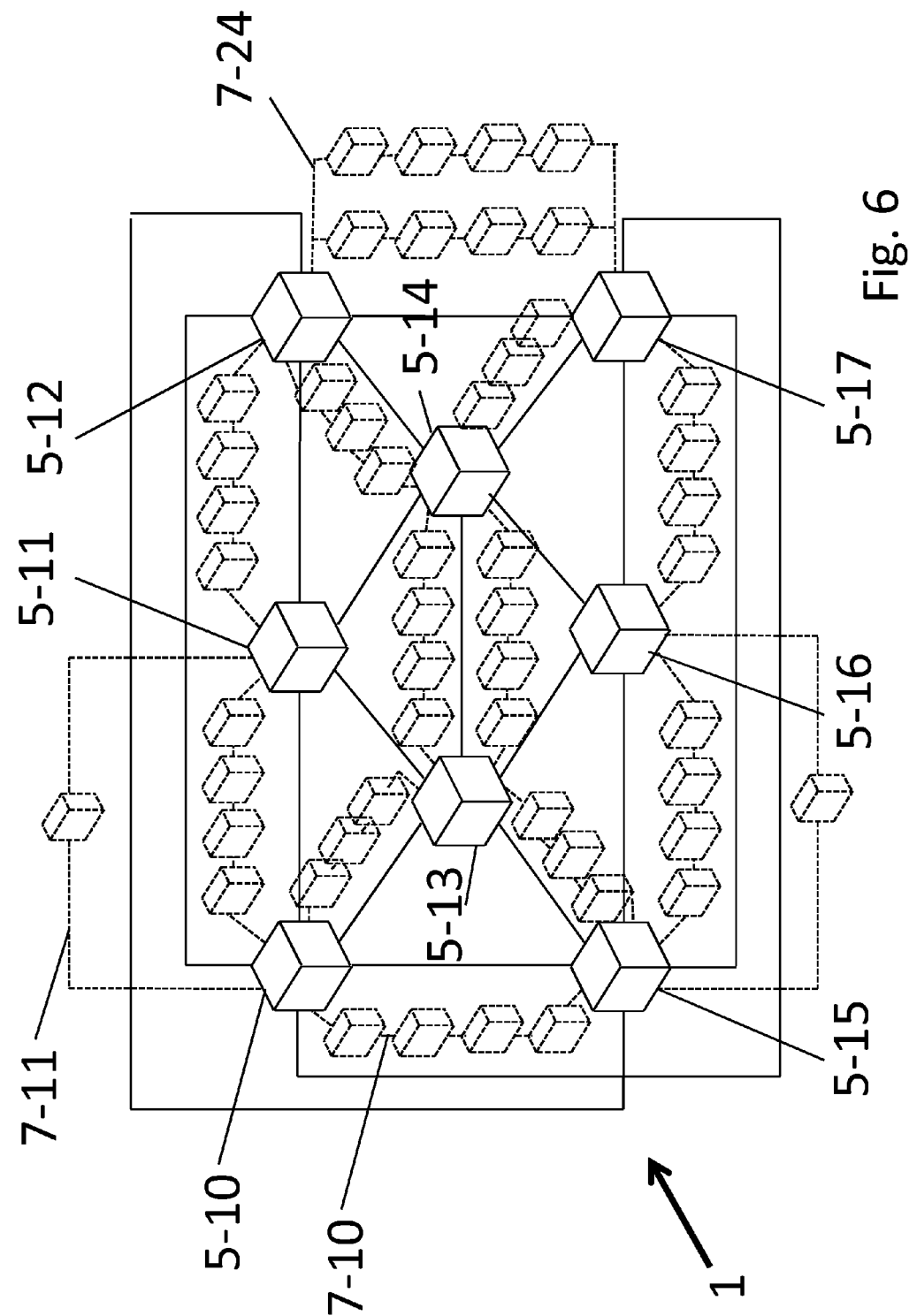
FIG. 6 shows a block diagram of an embodiment of a data network according to the present disclosure.

FIG. 6 shows a block diagram of an embodiment of a data network 1 according to the present disclosure.

The data network 1 of FIG. 6 is based on the primary data grid 3 of FIG. 4 and comprises fifteen data communication chains 7-10-7-24. In FIG. 6 only the first data communication chain 7-10 and the last data communication chain 7-24 have been labelled with a reference sign for ease of understanding.

The first data communication chain 7-10 is connected to the first primary data node 5-10 and to the sixth primary data node 5-15. A second data communication chain 7-11 is connected to the first primary data node 5-10 and to the second primary data node 5-11. A third data communication chain 7-12 is connected to the first primary data node 5-10 and to the second primary data node 5-11. A fourth data communication chain 7-13 is connected to the first primary data node 5-10 and to the fourth primary data node 5-13. A fifth data communication chain 7-14 is connected to the fourth primary data node 5-13 and to the sixth primary data node 5-15. A sixth data communication chain 7-15 is connected to the sixth primary data node 5-15 and to the seventh primary data node 5-16. A seventh data communication chain 7-16 is connected to the sixth primary data node 5-15 and to the seventh primary data node 5-16. An eighth data communication chain 7-17 is connected to the fourth primary data node 5-13 and to the fifth primary data node 5-14. A ninth data communication chain 7-18 is connected to the fourth primary data node 5-13 and to the fifth primary data node 5-14. A tenth data communication chain 7-19 is connected to the second primary data node 5-11 and to the third primary data node 5-12. An eleventh data communication chain 7-20 is connected to the third primary data node 5-12 and to the fifth primary data node 5-14. A twelfth data communication chain 7-21 is connected to the fifth primary data node 5-14 and to the eighth primary data node 5-17. A thirteenth data communication chain 7-22 is connected to the seventh primary data node 5-16 and to the eighth primary data node 5-17. A fourteenth data communication chain 7-23 is connected to the third primary data node 5-12 and to the eighth primary data node 5-17. Finally, a fifteenth data communication chain 7-24 is connected to the third primary data node 5-12 and to the eighth primary data node 5-17.

The data communication chains 7-10-7-24 comprise different numbers of secondary data nodes 6-1-6-n (which are not drawn with reference signs in FIG. 6 for ease of understanding). In FIG. 6 it can be seen that all the data communication chains 7-10-7-24 are connected to a primary data node 5-10-5-17 by the first secondary data node 6-1-6-n of the respective data communication chain 7-10-7-25 and by the last secondary data node 6-1-6-n of the respective data communication chain 7-10-7-25.

Some data communication chains 7-10-7-25, e.g. data communication chain 7-11, only comprise one secondary data node 6-1-6-n which is connected to two primary data nodes 5-10-5-n.

In other embodiments data communication chains 7-10-7-25 can be connected by only one of their respective secondary data nodes 6-1-6-n to a primary data node 5-1-5-n. Especially, they can also be connected to a primary data node 5-1-5-n by a secondary data node 6-1-6-n which is located in the middle of the respective data communication chain 7-10-7-25.

Figure 7:
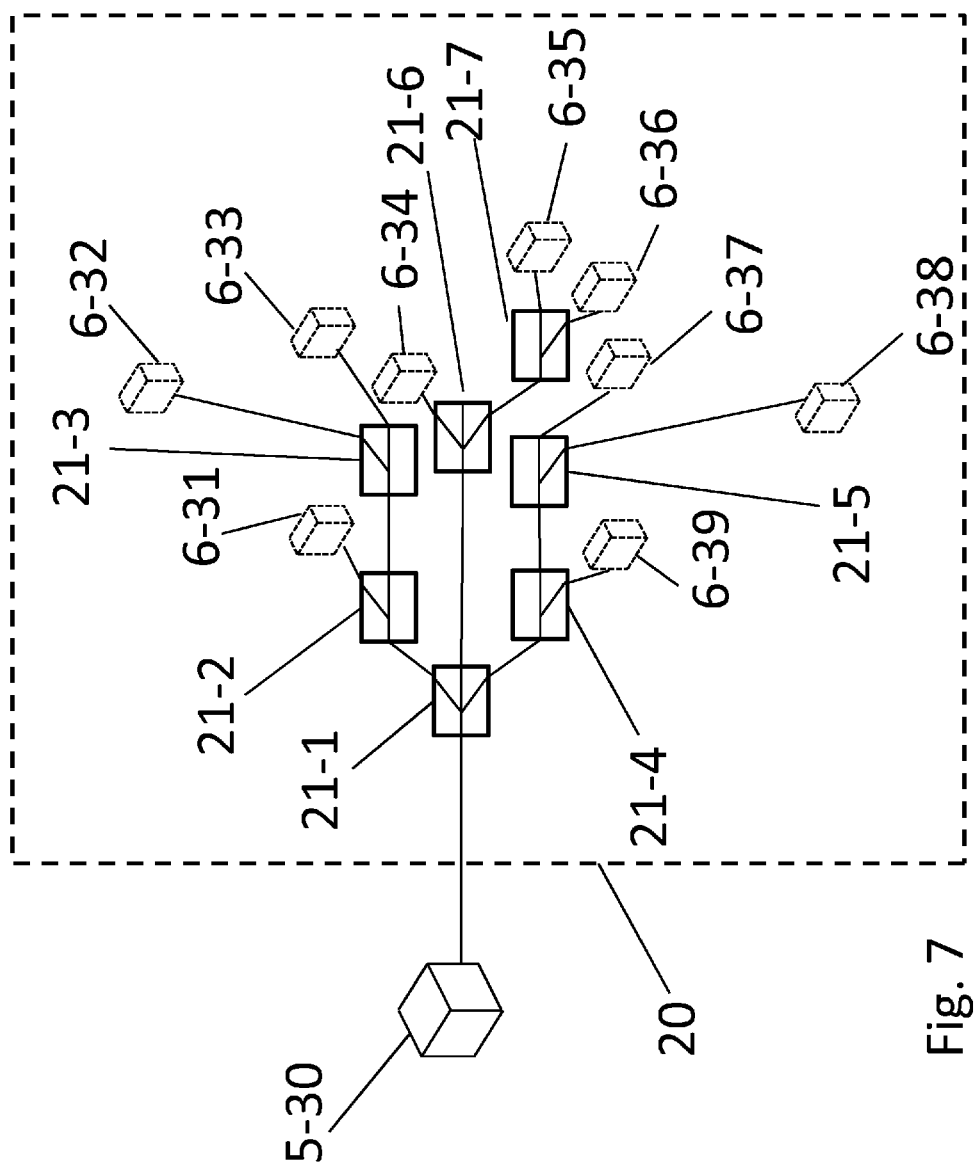
FIG. 7 shows a block diagram of an embodiment of a section of a data grid according to the present disclosure.

FIG. 7 shows a block diagram of an embodiment of a section of a data grid 1 according to the present disclosure.

The section of the data grid 1 shows a primary data node 5-30 which is connected to a backup data grid 20.

The backup data grid 20 comprises a first optical splitter 21-1 which is connected to the primary data node 5-30 and to three further optical splitters 21-2, 21-4 and 21-6.

The optical splitter 21-2 is further connected to a secondary data node 6-31 and to a further optical splitter 21-3. Optical splitter 21-3 is further connected to two secondary data nodes 6-32 and 6-33.

The optical splitter 21-6 is further connected to a secondary data node 6-34 and to a further optical splitter 21-7. Optical splitter 21-7 is further connected to a secondary data node 6-35 and to a secondary data node 6-36.

Optical splitter 21-4 is further connected to a secondary data node 6-39 and to a further optical splitter 21-5. Optical splitter 21-5 is further connected to secondary data node 6-37 and secondary data node 6-38.

In FIG. 7 the backup data grid 20 comprises a passive optical network. This is a data transmission technology which is different from Ethernet over optical fibre or copper twisted pair cable and prevents the backup data grid 20 from failing together with the primary data grid 3 or the secondary data grids 4-1-4-n because of a problem which might be inherent to the data transmission technology used in the primary data grid 3 or the secondary data grids 4-1-4-n.

In an aircraft a backup network can be used e.g. for aircraft control systems and safety related electronic systems. This has the advantage that the backup data grid 20 will not be the subject of customer customization. Furthermore the backup data grid 20 will provide a tree structure where either the sink or the source of a data transmission is the cockpit or the electronic bay or E-Bay.

Both are highly interconnected and installed close together. Therefore, in such an embodiment the backup data grid could be installed in a very limited amount of space.

In another embodiment the backup data grid 20 can comprise any other data transmission technology. Furthermore, the backup data grid 20 can comprise a redundant second backup data grid at least in part.

Figure 8:
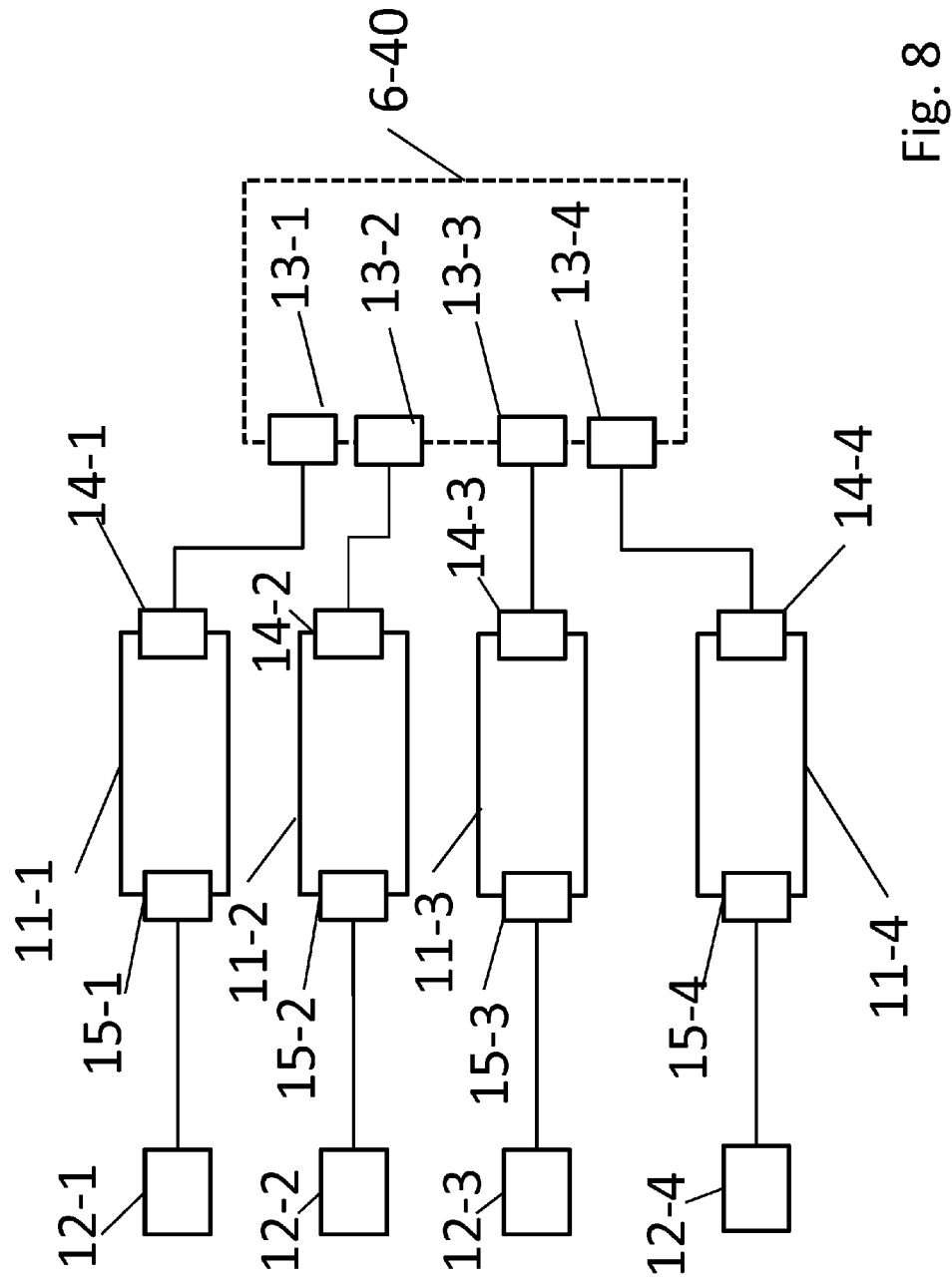
FIG. 8 shows a block diagram of an embodiment of a secondary data node with connected network access nodes.

FIG. 8 shows a block diagram of an embodiment of a secondary data node 6-40 with connected network access nodes 11-1-11-4.

The secondary data node 6-40 comprises four first data interfaces 13-1-13-4. The first first data interface 13-1 is connected to a second data interface 14-1 of the first network access node 11-1. The second first data interface 13-2 is connected to a second data interface 14-2 of the second network access node 11-2. The third first data interface 13-3 is connected to a second data interface 14-3 of the third network access node 11-3. Finally, the fourth first data interface 13-4 is connected to a second data interface 14-4 of the fourth network access node 11-4.

Every network access node 11-1-11-4 comprises a third data interface 15-1-15-4 which connects the respective network access node 11-1-11-4 to a respective data end consumer 12-1-12-n.

In FIG. 8 the first first data interface 13-1 is a wired data interface, e.g. a wire based Ethernet interface. In this case the first first data interface 13-1 and the second data interface 14-1 can be female plugs for an Ethernet cable accompanied by the respective transceivers.

The second first data interface 13-2 is a wireless data interface, e.g. a wireless local area network or WiMAX (Worldwide Interoperability for Microwave Access) interface.

The third first data interface 13-3 is a free space optical data interface, which e.g. transmits data via modulation of an infrared light source or a visible light source, e.g. the cabin lights of the aircraft.

The fourth first data interface 13-4 is a data over power data interface. This can be a data over cable power or data over wireless power, e.g. inductive power, data interface.

The order and sorting of the first data interfaces 13-1-13-4, the second data interfaces 14-1-14-4 and the third data interfaces 15-1-15-4 in FIG. 8 is just exemplary. In other embodiments secondary data nodes 6-1-6-n can comprise more or less than four first data interfaces 13-1-13-4.

The third data interfaces 15-1-15-4 can be any type of data interface which is required or used by the end data consumers 12-1-12-4. The network access nodes 11-1-11-4 serve as data translators from the respective third data interface 15-1-15-4 to the respective second data interface 14-1-14-4 and first data interface 13-1-13-4.

The data end consumers 12-1-12-4 can comprise any aircraft system or component that needs to communicate data with other aircraft systems or components. The data end consumers 12-1-12-4 can for example comprise aircraft control systems as well as entertainment or infotainment systems for the passengers. Furthermore, the data end consumers 12-1-12-4 can also comprise passengers' own devices, like laptop computers, smartphones, tablets or the like.

As depicted in the foregoing FIGS. 1-8 the present disclosure allows providing a data network 1 in an aircraft 2 with a standard wiring installation which can easily be extended to match the needs of certain applications or customers.

In one embodiment the primary data nodes 5-1-5-$n$ and the secondary data nodes 6-1-6-$n$ comprise standard form factor housings and/or standard form factor blind-mate installable connectors.

A data grid is to be understood herein as an electronic system comprising data nodes and communication lines, wherein the electronic systems are configured to communicate over the data lines.

The term data lines throughout this specification is not to be limited to physical data lines. Instead the term data lines is to be accorded the meaning of any data transmission mechanism(s) or method between two data nodes. Therefore a data line can also be a wireless data link, e.g. a WLAN data link, a Bluetooth data link or the like, between two data nodes.

A data node in this specification is every electronic device which is capable of communicating data over a data line.

A data communication chain is a chain of data nodes which are sequentially coupled to each other by data lines. Such a data communication chain is also called a daisy chain.

The term optical data lines refers to fibre optical data lines or to any other medium which is capable of transporting optical data signals.

A data route is a route between a first data node and a second data node through a data grid or through a plurality of interconnected data grids.

A network access node throughout this specification is a data node, which provides other electronic devices, like data end consumers, with an access to a data grid.

A data end consumer in this application is not a node of a data grid but an electronic device with access to a data grid. The data end consumer produces or consumes data which is transmitted over a data grid.

A wired data interface according to the present specification can be any data interface that uses wires, optical or electrical, to transmit data.

In this application a wireless data interface comprises any data interface that transmits data through air by use of electrical and/or magnetic waves and/or radio frequency.

A free space optical data interface according to the present patent disclosure is an optical data interface which does not use optical wires or optical fibres to transmit data via light. Instead a free space optical data interface uses a light source and transmits data through the air-like a wireless interface—by modulating the light source.

In this specification a data over power data interface is a data interface which transmits data and power to a device at the same time. The power and data transmission can be cable bound or wireless, e.g. inductive.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The accompanying drawings are included to provide a further understanding of the present disclosure and are incorporated in and constitute a part of this specification. The drawings illustrate the embodiments of the present disclosure and together with the description serve to explain the principles of the disclosure. Other embodiments of the present disclosure and many of the intended advantages of the present disclosure will be readily appreciated as they become better understood by reference to the detailed description. The elements of the drawings are not necessarily drawn to scale relative to each other.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the disclosure. Many other examples will be apparent to one skilled in the art upon reviewing the above specification.

Specific nomenclature used in the foregoing specification is used to provide a thorough understanding of the disclosure. However, it will be apparent to one skilled in the art in light of the specification provided herein that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed; obviously many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A data network for an aircraft or spacecraft, the data network comprising:
   a primary data grid comprising primary data nodes, wherein the primary data nodes are coupled in data communication with each other;
   at least one secondary data grid each comprising secondary data nodes and connecting the secondary data nodes in a data communication chain and connecting the first secondary data node of the data communication chain directly to a first respective primary data node and the last secondary data node of the data communication chain directly to a second respective primary data node; and a backup data grid, the backup data grid comprising a technology for data transmission that is different from technology of data transmission of the primary data grid.

2. The data network of claim 1, wherein the primary data grid comprises optical data lines configured to provide optical data connections between the primary data nodes, especially configured to provide the optical data connections with a bandwidth of at least 10 gigabits per second; and/or wherein the primary data grid is configured to provide a data connection between any two primary data nodes through a maximum of two other primary data nodes; and/or wherein the primary data grid is configured to provide at least two data routes between any two primary data nodes.

3. The data network of claim 1, wherein the primary data nodes and/or the secondary data nodes comprise network switches.

4. The data network of claim 1, wherein the secondary data grid comprises at least one network access node configured to provide data access to the secondary data grid for at least one data end consumer.

5. The data network of claim 4, wherein every secondary data node comprises at least one first data interface and wherein the at least one network access node comprises a second data interface configured to provide a data connection between the at least one network access node and one of the at least one first data interface of at least one of the secondary data nodes.

6. The data network of claim 4, wherein the at least one network access node comprises a third data interface configured to provide a data connection between the at least one network access node and the at least one data end consumer.

7. The data network of claim 6, wherein the third data interface comprises at least one of:
  a wired data interface;
  a wireless data interface;
  a free space optical data interface; and
  a data over power data interface.

8. The data network of claim 4, wherein every secondary data node is configured to route incoming data packets to all directly connected secondary data nodes, especially secondary data nodes which have not received the respective incoming data packet before, and/or only to network access nodes which have data end consumers connected to them.

9. The data network of claim 1, wherein every primary data node is configured to route incoming data packets to all directly connected other primary data nodes, especially primary data nodes which have not received the respective incoming data packet before, and/or to all directly connected secondary data nodes.

10. The data network of claim 1, wherein the backup data grid comprises a passive optical data network; and/or the backup data grid comprises a redundant data network.

11. The data network of claim 1, wherein the backup data grid is electronically connected to at least one of the primary data nodes.

12. An aircraft or spacecraft, comprising:
  a data network according to claim 1;
  at least one data end consumer coupled to the secondary data grid of the data network.

13. An aircraft or spacecraft, comprising:
  a data network comprising:
    a primary data grid comprising primary data nodes, wherein the primary data nodes are coupled in data communication with each other; and
    at least one secondary data grid each comprising secondary data nodes and connecting the secondary data nodes in a data communication chain and connecting the first secondary data node of the data communication chain directly to a first respective primary data node and the last secondary data node of the data communication chain directly to a second respective primary data node; and
  at least one data end consumer coupled to the secondary data grid of the data network;
  wherein the data lines of a primary data network are distributed in an airframe of the aircraft or spacecraft such that only one data line at a time can be cut by a local damage to the airframe.

14. A method for transmitting data in an aircraft or spacecraft, the method comprising:
  providing a primary data grid comprising primary data nodes;
  providing at least one secondary data grid comprising secondary data nodes, the secondary data nodes being connected in a data communication chain;
  providing a backup data grid, the backup data grid comprising a technology for data transmission that is different from the technology of data transmission of the primary data grid;
  connecting the first secondary data node of the data communication chain directly to a first respective primary data node and the last secondary data node of the data communication chain directly to a second respective primary data node;
  connecting at least two data end consumers to the secondary data nodes; and
  transmitting data between the at least two data end consumers via the primary data grid and/or the secondary data grid.

* * * * *